United States Patent
Mutou et al.

(10) Patent No.: US 12,278,030 B2
(45) Date of Patent: *Apr. 15, 2025

(54) METHOD FOR MANUFACTURING MULTILAYER VARISTOR AND MULTILAYER VARISTOR

(71) Applicant: Panasonic Intellectual Property Management Co., Ltd., Osaka (JP)

(72) Inventors: Naoki Mutou, Hokkaido (JP); Yoshiyuki Satou, Hokkaido (JP); Yuji Yamagishi, Hokkaido (JP); Ken Yanai, Hokkaido (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 54 days.

This patent is subject to a terminal disclaimer.

(21) Appl. No.: 18/098,998

(22) Filed: Jan. 19, 2023

(65) Prior Publication Data
US 2023/0245806 A1 Aug. 3, 2023

(30) Foreign Application Priority Data
Jan. 31, 2022 (JP) .................. 2022-013569

(51) Int. Cl.
*H01C 7/112* (2006.01)
*C04B 35/453* (2006.01)
(Continued)

(52) U.S. Cl.
CPC ............ *H01C 7/112* (2013.01); *C04B 35/453* (2013.01); *C04B 35/64* (2013.01); *H01C 7/18* (2013.01)

(58) Field of Classification Search
CPC ......... H01C 7/112; H01C 7/18; C04B 35/453; C04B 35/64
See application file for complete search history.

(56) References Cited

U.S. PATENT DOCUMENTS 5,870,273 A * 2/1999 Sogabe ............... H01G 4/40
338/21
2016/0027561 A1 1/2016 Inoue et al.

FOREIGN PATENT DOCUMENTS

JP   H05-283209 A   10/1993
JP   2005-197281 A   7/2005
(Continued)

OTHER PUBLICATIONS

Non-Final Office Action dated Feb. 4, 2025 issued in the related U.S. Appl. No. 18/099,008.

*Primary Examiner* — Kyung S Lee
(74) *Attorney, Agent, or Firm* — Rimon P.C.

(57) ABSTRACT

A method for manufacturing a multilayer varistor includes: a first step including providing a multilayer stack in which a plurality of green sheet layers, each containing a Zn oxide powder as a main component and a Pr oxide powder as a sub-component, and a plurality of internal electrode paste layers, each containing a Pd powder, are alternately stacked; and a second step including forming a sintered compact, including an internal electrode inside, by baking the multilayer stack. The second step includes: a first sub-step including baking the multilayer stack by setting an oxygen concentration in an atmosphere at 1000 ppm by volume or less while increasing a temperature from 500° C. to 800° C.; and a second sub-step including baking, after the first sub-step, the multilayer stack by setting the oxygen concentration in the atmosphere at 1000 ppm by volume or more while increasing the temperature to a maximum allowable temperature.

6 Claims, 1 Drawing Sheet

(51) Int. Cl.
*C04B 35/64* (2006.01)
*H01C 7/18* (2006.01)

(56) References Cited

FOREIGN PATENT DOCUMENTS

JP  2007-043133 A  2/2007
KR  10-2015-0012075 A  2/2015

* cited by examiner

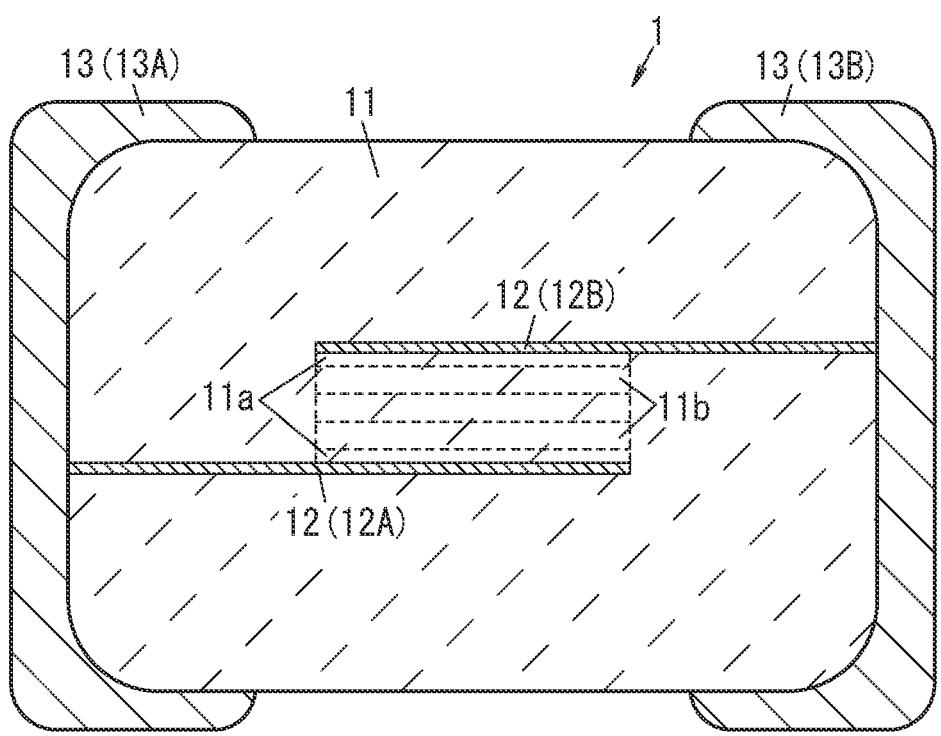

METHOD FOR MANUFACTURING MULTILAYER VARISTOR AND MULTILAYER VARISTOR

CROSS-REFERENCE TO RELATED APPLICATIONS

The present application is based upon, and claims the benefit of priority to, Japanese Patent Application No. 2022-013569, filed on Jan. 31, 2022, the entire contents of which are hereby incorporated by reference.

TECHNICAL FIELD

The present disclosure generally relates to a method for manufacturing a multilayer varistor and a multilayer varistor, and more particularly relates to a method for manufacturing a multilayer varistor including the step of forming a sintered compact, and a multilayer varistor including a sintered compact, internal electrodes, and external electrodes.

BACKGROUND ART

Multilayer varistors have been used to, for example, protect various types of electronic equipment and electronic devices from an abnormal voltage generated by lighting surge or static electricity, for example, and prevent the various types of electronic equipment and electronic devices from malfunctioning due to noise generated in a circuit.

JP 2007-043133 A discloses a multilayer varistor including a ceramic body, formed by stacking a plurality of ceramic layers and a plurality of internal electrodes one on top of another, and an external electrode. In the multilayer varistor, the ceramic layers each include ZnO as a main component thereof and Pr, Co, and at least one selected from the group consisting of Al, Ga, and In as sub-components thereof, and the internal electrodes each include Ag and Pd. JP 2007-043133 A also teaches that a baking step of forming the ceramic body is performed under a nitrogen atmosphere all through the temperature increasing step.

However, the multilayer varistor, manufactured using the sintered compact that has been formed by performing the baking step under the nitrogen atmosphere according to the method of JP 2007-043133 A, tends to exhibit a significant dispersion in its varistor characteristics, which are represented by a V1 mA variation coefficient, for example, and also has insufficient voltage nonlinearity, which is represented by a voltage nonlinearity index (a), for example.

SUMMARY

The present disclosure provides a method for manufacturing a multilayer varistor which tends to exhibit a significantly reduced dispersion in its varistor characteristics and excellent voltage nonlinearity and also provides such a multilayer varistor.

A method for manufacturing a multilayer varistor according to an aspect of the present disclosure includes a first step and a second step. The first step includes providing a multilayer stack in which a plurality of green sheet layers and a plurality of internal electrode paste layers are alternately stacked one on top of another. Each of the plurality of green sheet layers contains a Zn oxide powder as a main component thereof and a Pr oxide powder as a sub-component thereof. Each of the plurality of internal electrode paste layers contains a Pd powder. The second step includes forming a sintered compact including an internal electrode inside by baking the multilayer stack. The second step includes a step 2B and a step 2C to be performed after the step 2B has been performed. The step 2B includes baking the multilayer stack by setting an oxygen concentration in an atmosphere at 1000 ppm by volume or less while increasing a temperature from 500° C. to 800° C. The step 2C includes baking the multilayer stack by setting the oxygen concentration in the atmosphere at 1000 ppm by volume or more while increasing the temperature to a maximum allowable temperature.

A multilayer varistor according to another aspect of the present disclosure includes a sintered compact, at least one pair of internal electrodes, and at least one pair of external electrodes. The sintered compact contains a Zn oxide as a main component thereof and a Pr oxide as a sub-component thereof. The at least one pair of internal electrodes is provided inside the sintered compact and contains Pd as a main component thereof. The at least one pair of external electrodes is arranged to cover the sintered compact partially and electrically connected to the at least one pair of internal electrodes, respectively. In a part, located between the at least one pair of internal electrodes, of the sintered compact, a concentration of Pr relative to Zn in a neighboring region in the vicinity of each of the at least one pair of internal electrodes is at most twice as high as a concentration of Pr relative to Zn in a region adjacent to the neighboring region.

BRIEF DESCRIPTION OF DRAWINGS

The figures depict one or more implementations in accordance with the present teaching, by way of example only, not by way of limitations. In the figures, like reference numerals refer to the same or similar elements.

FIG. 1 is a schematic cross-sectional view of a multilayer varistor according to an exemplary embodiment.

DETAILED DESCRIPTION

(1) Overview

A method for manufacturing a multilayer varistor and a multilayer varistor according to an exemplary embodiment of the present disclosure will now be described with reference to the accompanying drawings. FIG. 1 to be referred to in the following description of embodiments is a schematic representation. Thus, the ratio of the dimensions (including thicknesses) of respective constituent elements illustrated in FIG. 1 does not always reflect their actual dimensional ratio.

A method for manufacturing a multilayer varistor 1 according to an exemplary embodiment includes a first step and a second step. The first step includes providing a multilayer stack in which a plurality of green sheet layers and a plurality of internal electrode paste layers are alternately stacked one on top of another. Each of the plurality of green sheet layers contains a Zn oxide powder as a main component thereof and a Pr oxide powder as a sub-component thereof. Each of the plurality of internal electrode paste layers contains a Pd powder. The second step includes forming a sintered compact including an internal electrode 12 inside by baking the multilayer stack. The second step includes a step 2B (corresponding to the first sub-step) and a step 2C (corresponding to the second sub-step) to be performed after the step 2B has been performed. The step 2B includes baking the multilayer stack by setting an oxygen concentration in an atmosphere at 1000 ppm by volume or less while increasing a temperature from 500° C. to 800° C.

The step 2C includes baking the multilayer stack by setting the oxygen concentration in the atmosphere at 1000 ppm by volume or more while increasing the temperature to a maximum allowable temperature.

The present inventors carried out extensive research and development on a method for manufacturing a multilayer varistor. As a result, the present inventors discovered that the dispersion in varistor characteristics could be reduced by setting an oxygen concentration in the atmosphere at 1000 ppm by volume or less while increasing the temperature from 500° C. to 800° C. (hereinafter referred to as "step (1)"). In addition, the present inventors also discovered that excellent voltage nonlinearity was achieved by setting the oxygen concentration in the atmosphere after the step (1) at 1000 ppm by volume or more while increasing the temperature to a maximum allowable temperature (hereinafter referred to as "step (2)"). Thus, the method for manufacturing a multilayer varistor 1 according to this embodiment enables providing a multilayer stack which tends to exhibit a significantly reduced dispersion in its varistor characteristics and excellent voltage nonlinearity.

As described above, the dispersion in varistor characteristics could be reduced by setting an oxygen concentration in the atmosphere at 1000 ppm by volume or less while increasing the temperature from 500° C. to 800° C. as in the step (1). It is not completely clear why this advantage is achieved by taking this measure, but the reason is presumably as follows. Specifically, the dispersion in the characteristics of the varistor would be caused partly because of a non-uniform distribution of a Pr oxide. Such non-uniformity in the distribution of the Pr oxide would be caused by the reaction between the Pr oxide in a green sheet layer and Pd in an internal electrode paste layer during the sintering process, which would allow the Pr oxide to move more easily toward the internal electrodes. The present inventors discovered that this reaction between the Pr oxide and Pd could be reduced by setting the oxygen concentration in the atmosphere at a relatively low value while increasing the temperature during the baking process.

In addition, excellent voltage nonlinearity was achieved by setting, in the step (2) after the step (1), the oxygen concentration in the atmosphere at 1000 ppm by volume or more while increasing the temperature to a maximum allowable temperature. It is not completely clear why this advantage is achieved by taking this measure, but the reason is presumably as follows. Specifically, if ZnO is sintered in an atmosphere with a low oxygen concentration, for example, then $Zn^+$ concentration in ZnO would increase, thus causing a decrease in the grain boundary insulation resistance and thereby causing a decrease in the voltage nonlinearity. However, setting the oxygen concentration at a certain value or more would reduce the chances of causing a decline in the grain boundary insulation resistance, thus improving the voltage nonlinearity.

As shown in FIG. 1, a multilayer varistor 1 according to this embodiment includes a sintered compact 11, at least one pair of internal electrodes 12, and at least one pair of external electrodes 13. The sintered compact 11 contains a Zn oxide as a main component thereof and a Pr oxide as a subcomponent thereof. The at least one pair of internal electrodes 12 is provided inside the sintered compact 11 and contains Pd as a main component thereof. The at least one pair of external electrodes 13 is arranged to cover the sintered compact 11 partially and electrically connected to the at least one pair of internal electrodes 12, respectively. In a part, located between the at least one pair of internal electrodes 12, of the sintered compact 11, a concentration of Pr relative to Zn in a region 11a (hereinafter referred to as a "neighboring region 11a") in the vicinity of each of the at least one pair of internal electrodes 12 is at most twice as high as a concentration of Pr relative to Zn in a region 11b (hereinafter referred to as an "adjacent region 11b") adjacent to the neighboring region 11a.

The multilayer varistor 1 according to this embodiment tends to exhibit a significantly reduced dispersion in its varistor characteristics and excellent voltage nonlinearity.

Thus, the present disclosure provides a multilayer varistor which tends to exhibit a significantly reduced dispersion in its varistor characteristics and excellent voltage nonlinearity (2) Details <Method for Manufacturing Multilayer Varistor>

A method for manufacturing a multilayer varistor 1 according to this embodiment includes a first step and a second step.

Optionally, the method for manufacturing a multilayer varistor 1 according to this embodiment may further include, for example, the steps of: forming an insulating coating layer covering at least a part of the sintered compact 11 formed in the second step (hereinafter referred to as an "insulating coating layer forming step"); forming the external electrodes which cover either the sintered compact 11 or the insulating coating layer partially and which are electrically connected to the internal electrodes 12 (hereinafter referred to as an "external electrode forming step"); and forming plated electrodes which cover the external electrodes at least partially (hereinafter referred to as a "plated electrode forming step").

The respective process steps will now be described one by one.

First Step

The first step includes providing a multilayer stack in which a plurality of green sheet layers and a plurality of internal electrode paste layers are alternately stacked one on top of another. As used herein, "providing a multilayer stack" refers to either forming the multilayer stack from the beginning or purchasing the multilayer stack as a commercially available product, whichever is appropriate.

(Green Sheet Layer)

Each green sheet layer contains a Zn oxide powder as a main component thereof and a Pr oxide powder as a subcomponent thereof.

Examples of the Zn oxide include ZnO. Examples of the Pr oxide include $Pr_6O_{11}$.

The green sheet layer may be formed by preparing a slurry as a mixture of the Zn oxide powder, the Pr oxide powder, and an organic component such as an organic solvent and a binder and turning the slurry into a sheet shape by using a coating machine, for example.

(Internal Electrode Paste Layer)

Each internal electrode paste layer contains a Pd powder. Examples of the Pd powder include a Pd powder and an AgPd powder.

The internal electrode paste layer may be formed on the green sheet layer by, for example, preparing an internal electrode paste containing a Pd powder and printing the internal electrode paste onto the green sheet layer, for example. It is preferable that at least one element selected from the group consisting of Al, In, and Ga be substantially not contained in the internal electrode paste. If the internal electrode 12 formed includes at least one of these elements, the voltage nonlinearity of the multilayer varistor 1 could decrease. As used herein, the phrase "substantially not contained" means not adding the element(s) intentionally except a situation where the element(s) is/are contained inevitably. Specifically, this phrase refers to a situation where the content of at least one of these elements is equal to or less than 0.00001% by mass with respect to Pd as a constituent element of the internal electrode 12.

A multilayer stack may be formed by stacking the green sheet layer thus formed and the green sheet layer on which the internal electrode paste layer has been formed one on top of another. This multilayer stack includes at least one pair of internal electrode paste layers inside which will turn into the internal electrodes 12 when baked.

Second Step

The second step includes forming a sintered compact, including the internal electrodes 12 inside, by baking the multilayer stack that has been formed in the first step. The multilayer stack formed in the first step is cut off into multiple green chips, which are subjected to the baking process. The baking process may be performed using a known baking furnace such as a ceramic setter. When baked, the internal electrode paste layers inside the multilayer stack turn into internal electrodes 12.

The second step includes a step 2B (corresponding to the first sub-step) and a step 2C (corresponding to the second sub-step) to be performed after the step 2B has been performed. When the baking process is performed in the second step, the pressure (absolute pressure) applied is preferably equal to or higher than 0.01 atm and equal to or lower than 2 atm, and more preferably equal to or higher than 0.5 atm and equal to or lower than 1.5 atm. The baking process in the second step is usually performed under the atmospheric pressure. Examples of gases, other than oxygen, included in the atmosphere in which the baking process is performed in the second step include inert gases such as nitrogen and argon gases.

The second step preferably includes a step 2A (corresponding to the third sub-step) to be performed before the step 2B. When the baking process is performed in these steps 2A, 2B, and 2C, the pressure applied and the gases other than oxygen may be the same or different from each other, whichever is appropriate.

Next, these process steps will now be described in detail one by one.

(Step 2A)

The step 2A includes baking the multilayer stack while increasing the temperature before the step 2B. The step 2A may include increasing the temperature from room temperature (25° C.) to 500° C., for example.

When the baking process is performed in the step 2A, the oxygen concentration in the atmosphere is preferably equal to or higher than 100 ppm by volume. This allows the multilayer stack to be sintered more perfectly while reducing the chances of causing an increase in $Zn^+$ concentration in ZnO and thereby causing a decline in the grain boundary insulation resistance during the baking process, thus further improving the voltage nonlinearity. As used herein, the unit "ppm by volume" means volume ppm of oxygen with respect to the entire volume of the gas and is approximately equal to mole ppm (molar ppm) of oxygen with respect to the number of moles of all molecules that form the gas.

The oxygen concentration in the atmosphere is more preferably equal to or higher than 200 ppm by volume, even more preferably equal to or higher than 300 ppm by volume, and particularly preferably equal to or higher than 400 ppm by volume. Meanwhile, the oxygen concentration in the atmosphere may be equal to or lower than 1000 ppm by volume, for example, is preferably equal to or lower than 800 ppm by volume, and is even more preferably equal to or lower than 600 ppm by volume.

The step 2A preferably includes setting the average temperature increase rate at a value equal to or greater than 10° C./h and equal to or less than 100° C./h and more preferably includes setting the average temperature increase rate at a value equal to or greater than 30° C./h and equal to or less than 70° C./h.

(Step 2B)

The second 2B includes baking the multilayer stack while increasing the temperature from 500° C. to 800° C. The baking process in the step 2B may be performed to a temperature higher than 800° C. (e.g., to 850° C. or 900° C.).

The step 2B includes baking the multi-layer stack while setting the oxygen concentration in the atmosphere at 1000 ppm by volume or less. Setting the oxygen concentration in the atmosphere at 1000 ppm by volume or less in the baking process in the step 2B enables reducing the reaction between Pd in the internal electrode paste layer and a Pr oxide, which is a sub-component in the green sheet layer, and thereby reducing the chances of the Pr oxide moving toward the internal electrode paste layer. Consequently, this enables reducing the non-uniformity in the distribution of the Pr oxide and thereby reducing the dispersion in the varistor characteristics. The oxygen concentration in the atmosphere is preferably equal to or lower than 800 ppm by volume, more preferably equal to or lower than 700 ppm by volume, and even more preferably equal to or lower than 600 ppm by volume. Meanwhile, the oxygen concentration in the atmosphere is preferably equal to or higher than 0.1 ppm by volume, more preferably equal to or higher than 1 ppm by volume, and even more preferably equal to or higher than 5 ppm by volume.

If the oxygen concentration in the atmosphere is equal to or higher than 100 ppm by volume and equal to or lower than 1000 ppm by volume in the step 2B, the average temperature increase rate is preferably equal to or greater than 100° C./h and equal to or less than 1000° C./h. This enables, even if the oxygen concentration is relatively high in the step 2B, further reducing the chances of the Pr oxide moving toward the internal electrode paste layer, and thereby further reducing the dispersion in the varistor characteristics, by further increasing the temperature increase rate. This average temperature increase rate is more preferably equal to or greater than 200° C./h and equal to or less than 800° C./h, even more preferably equal to or greater than 300° C./h and equal to or less than 700° C./h, and particularly preferably equal to or greater than 400° C./h and equal to or less than 600° C./h.

If the oxygen concentration in the atmosphere is equal to or higher than 0.1 ppm by volume and equal to or lower than 100 ppm by volume in the step 2B, the average temperature increase rate is preferably equal to or greater than 25° C./h and equal to or less than 200° C./h. This enables, if the oxygen concentration is relatively low in the step 2B, further reducing the chances of the Pr oxide moving toward the internal electrode paste layer, and thereby further reducing the dispersion in the varistor characteristics, by further decreasing the temperature increase rate. This average temperature increase rate is more preferably equal to or greater than 30° C./h and equal to or less than 150° C./h, even more preferably equal to or greater than 35° C./h and equal to or less than 100° C./h, and particularly preferably equal to or greater than 40° C./h and equal to or less than 60° C./h.

(Step 2C)

The step 2C includes baking the multi-layer stack while increasing the temperature to the maximum allowable temperature after the step 2B has been performed. In the step 2C, the temperature may be increased from, for example, 800° C., 850° C., or 900° C. The maximum allowable temperature is preferably equal to or higher than 1000° C. and equal to or lower than 1500° C., more preferably equal to or higher than 1100° C. and equal to or lower than 1450° C., and even more preferably equal to or higher than 1200° C. and equal to or lower than 1400° C.

The step 2C includes setting the oxygen concentration in the atmosphere at a value equal to or higher than 1000 ppm by volume. Setting the oxygen concentration in the atmosphere at a value equal to or higher than 1000 ppm by volume while baking the multi-layer stack in the step 2C enables reducing the chances of causing a decrease in the grain boundary insulation resistance, which would otherwise be caused while the Zn oxide is being sintered, thus enabling improving the voltage nonlinearity significantly. The oxygen concentration in the atmosphere is preferably equal to or higher than 1500 ppm by volume, more preferably equal to or higher than 1800 ppm by volume, and even more preferably equal to or higher than 2000 ppm by volume.

The step 2C preferably includes setting the average temperature increase rate at a value equal to or greater than 100° C./h and equal to or less than 400° C./h. Setting the average temperature increase rate at a value falling within this range reduces the variation in, and stabilizes, the oxygen concentration in the atmosphere, thus enabling further reducing the chances of causing a decrease in the grain boundary insulation resistance while the Zn oxide is being sintered and thereby further improving the voltage nonlinearity. The average temperature increase rate is more preferably equal to or greater than 130° C./h and equal to or less than 350° C./h, even more preferably equal to or greater than 150° C./h and equal to or less than 300° C./h, and particularly preferably equal to or greater than 180° C./h and equal to or less than 250° C./h.

The sintered compact 11 including the internal electrodes 12 inside may be formed by baking the multi-layer stack in this manner in the second step.

[Protective Layer Forming Step]

The protective layer forming step includes forming a protective layer (as an insulating coating layer or a high-resistivity layer) covering at least a part of the sintered compact 11. The protective layer may contain, for example, silicon oxide, zinc silicate, or a glass component. The protective layer may be formed by, for example, applying a solution containing a precursor of silicon oxide or applying a glass component.

[External Electrode Forming Step]

The external electrode forming step includes forming an external electrode 13 by applying an external electrode paste to make the external electrode paste partially cover either the sintered compact 11 formed in the second step or the protective layer formed in the protective layer forming step and come into contact with the internal electrodes 12 partially.

The external electrode paste may be prepared by mixing together a metal component such as an Ag powder, an AgPd powder, or an AgPt powder, a glass component such as $Bi_2O_3$, $SiO_2$, or $B_2O_5$, for example, and a solvent. Alternatively, a paste containing Ag as a main component and a resin component may also be used as the external electrode paste.

Baking, at a temperature equal to or higher than 700° C. and equal to or lower than 800° C., the external electrode paste that has been applied enables promoting alloying with the internal electrodes 12 and thereby forming external electrodes 13 with the degree of adhesion increased.

[Plated Electrode Forming Step]

The plated electrode forming step includes forming plated electrodes which cover the external electrodes 13 at least partially.

The plated electrodes may be formed by, for example, performing Ni plating and Sn plating in this order by electroplating technique, for example.

<Multilayer Varistor>

A multilayer varistor 1 according to this embodiment may be manufactured by the method for manufacturing a multilayer varistor 1 described above. The multilayer varistor 1 includes a sintered compact 11, at least one pair of internal electrodes 12, and at least one pair of external electrodes 13.

The sintered compact 11 is made of a semiconductor ceramic component with a nonlinear resistance characteristic.

The multilayer varistor 1 needs to include at least one pair of internal electrodes 12. The multilayer varistor 1 shown in FIG. 1 includes one pair of internal electrodes 12. In other words, the internal electrodes 12 include a first internal electrode 12A and a second internal electrode 12B.

The multilayer varistor 1 needs to include at least one pair of external electrodes 13. One external electrode 13 is provided to be electrically connected to a single internal electrode 12 or plurality of internal electrodes 12. The multilayer varistor 1 shown in FIG. 1 includes one pair of external electrodes 13. In other words, the pair of external electrodes 13 consists of a first external electrode 13A provided on one end face of the sintered compact 11 and a second external electrode 13B provided on the other end face of the sintered compact 11. When a voltage is applied between the first external electrode 13A and the second external electrode 13B, one of the first and second external electrodes 13A, 13B comes to have the higher potential and the other of the first and second external electrodes 13A, 13B comes to have the lower potential.

The at least pair of external electrodes 13 are mounted on a printed wiring board on which an electric circuit is formed. The multilayer varistor 1 may be connected to, for example, the input end of the electric circuit. Upon the application of a voltage higher than a predetermined threshold voltage to between the first external electrode 13A and the second external electrode 13B, the electrical resistance between the first external electrode 13A and the second external electrode 13B decreases steeply to cause an electric current to flow through a varistor layer. This enables protecting the electric circuit that follows the multilayer varistor 1.

Optionally, the multilayer varistor 1 may further include a protective layer and a plated electrode, for example, besides the sintered compact 11, the internal electrodes 12, and the external electrodes 13.

Next, the respective constituent elements of the multilayer varistor 1 will be described one by one.

[Sintered Compact]

The semiconductor ceramic component having a nonlinear resistance characteristic as a constituent material for the sintered compact 11 may contain a Zn oxide as a main component thereof and a Pr oxide as a sub-component thereof.

Examples of the Zn oxide include ZnO. Examples of the Pr oxide include $Pr_6O_{11}$.

[Internal Electrodes]

The internal electrodes 12 are provided inside the sintered compact 11. The internal electrodes 12 each contain Pd as a main component thereof. Examples of Pd as the main component include Pd and AgPd.

It is preferable that at least one element selected from the group consisting of Al, In, and Ga be substantially not contained in the internal electrodes 12. If the internal electrodes 12 contain any of these elements, the voltage nonlinearity of the multilayer varistor 1 would decrease in some cases.

(Distribution of Pr Oxide in Sintered Compact)

As an index to the degree of non-uniformity in the distribution of a Pr oxide in the sintered compact 11, a ratio of the concentration of Pr relative to Zn in neighboring regions 11a (hereinafter referred to as a "Pr concentration (1)") to the concentration of Pr relative to Zn in adjacent regions 11b (hereinafter referred to as a "Pr concentration (2)") in a part located between the pair of internal electrodes 12 inside the sintered compact 11 may be used as shown in FIG. 1. The "neighboring regions 11a" are regions in the vicinity of the internal electrodes 12. The "adjacent regions 11b" are regions adjacent to the neighboring regions 11a. This ratio (Pr concentration (1)/Pr concentration (2)) will be hereinafter referred to as a "Pr concentration increase ratio." That is to say, the Pr concentration increase ratio is the ratio of the Pr concentration in the neighboring regions 11a to the Pr concentration in the adjacent regions 11b. When measured along a normal to the internal electrodes 12, the thickness of the neighboring regions 11a may be 5 μm, for example, and the thickness of the adjacent regions 11b may be 10 μm, for example.

In known multilayer varistors 1, the Pr oxide moves toward the internal electrode paste layers while the sintered compact is being formed by baking, thus making the Pr concentration increase ratio a significantly large value. In contrast, the multilayer varistor 1 according to this embodiment would decrease the non-uniformity in the distribution of the Pr oxide by restricting the movement of the Pr oxide, thus making the Pr concentration increase ratio a significantly decreased value.

In this case, the "concentration of Pr relative to Zn" in each of the neighboring regions 11a and the adjacent regions 11b may be determined by analyzing, using an X-ray microanalyzer (XMA), a cross section of the multilayer varistor 1 that has been taken to expose the respective regions and measuring the X-ray intensities derived from Zn or Pr in each of these regions.

In the multilayer varistor 1 according to this embodiment, the Pr concentration increase ratio is equal to or less than 2.0 (i.e., twice). That is to say, the movement of the Pr oxide toward the internal electrode paste layers has not been advanced so significantly that the Pr oxide is distributed substantially uniformly in the region located between the pair of internal electrodes 12. This would be the reason this multilayer varistor 1 has excellent voltage nonlinearity.

The Pr concentration increase ratio is preferably equal to or less than 1.5, more preferably equal to or less than 1.3, even more preferably equal to or less than 1.2, and particularly preferably equal to or less than 1.1.

[Protective Layer]

The protective layer (insulating coating layer, high-resistivity layer) is arranged to cover the sintered compact 11 at least partially. The protective layer contains, for example, silicon oxide, zinc silicate, and/or a glass component.

[External Electrodes]

The external electrodes 13 are arranged to cover either the sintered compact 11 or the protective layer partially. Also, the external electrodes 13 are electrically connected to the at least one pair of internal electrodes 12, respectively. The external electrodes 13 each contain a metallic component such as Ag, AgPd, or AgPt and a glass component such as $Bi_2O_3$, $SiO_2$, or $B_2O_5$.

[Plated Electrodes]

The plated electrodes are arranged to cover the external electrodes 13 at least partially. The plated electrodes may be, for example, Ni plated electrodes or Sn plated electrodes.

EXAMPLES

The present disclosure will now be described more specifically by way of illustrative examples. Note that the specific examples to be described below are only examples of the present disclosure and should not be construed as limiting.

<Manufacturing Multilayer Varistor>

Multilayer varistors representing first and second examples and first, second, and third comparative examples were manufactured in the following procedure.

[Forming Sintered Compact]

(Preparing Slurry)

A slurry was prepared by adding organic components such as an organic solvent and a binder to a mixture including ZnO (98.5% by mass) as a main material and $Pr_6O_{11}$ (0.5% by mass), $Co_2O_3$ (0.5% by mass), and CaO (0.5% by mass) as sub-materials.

(Forming Green Sheet Layer)

The slurry thus prepared was used and formed, using a coating machine, to a predetermined thickness equal to or greater than 20 μm and equal to or less than 50 μm, thereby forming a green sheet layer.

(Forming Green Sheet Layer on which Internal Electrode Paste Layer is Formed)

A paste having the components shown in the "internal electrode composition" column in the following Table 1 was used as an internal electrode paste, which was printed in a predetermined pattern on the green sheet layer that had been formed as described above, thereby forming a green sheet layer on which the internal electrode paste layer had been formed.

In Table 1, "AgPd (30:70)" refers to an AgPd alloy (with a mixture mass ratio of 30/70).

Also, in Table 1, the phrase "Pd+0.1 mol % of Al added" means that 0.1 mol % of an Al oxide was added to Pd.

(Forming Multilayer Stack)

A multilayer stack was formed by stacking, one on top of another, the green sheet layer formed described above and the green sheet layers on each of which the internal electrode paste layer had been formed as described above.

(Baking)

A sintered compact having internal electrodes inside was formed by baking the multi-layer stack under the condition including the temperature increase process temperatures, temperature increase rates, and oxygen concentrations shown in the "Step 2A," "Step 2B," and "Step 2C" columns of the following Table 1 and the atmospheric pressure.

Note that in Table 1, "ppm" of the oxygen concentration means "ppm by volume."

[Forming External Electrodes]

An external electrode paste was prepared by mixing an Ag powder, a glass frit, and a solvent together. The external electrode paste thus prepared was applied onto end surfaces of the sintered compact formed as described above and then baked at 800° C., thereby forming external electrodes.

[Forming Plated Electrodes]

An Ni plated electrode was formed by electrolytic plating to a predetermined thickness on each of the external electrodes that had been formed as described above and then an Sn plated electrode was formed thereon.

Evaluations

The multilayer varistor thus formed was evaluated by the following method in terms of variation coefficient and voltage nonlinearity. In addition, the Pr concentration increase ratio (that is the ratio of the concentration of Pr relative to Zn in the neighboring regions to the concentration of Pr relative to Zn in the adjacent regions) was measured. Furthermore, the sintered compact that would serve as a multilayer varistor had its sintering condition evaluated.

(V1 mA Variation Coefficient)

A V1mA variation coefficient was obtained as an index to the degree of dispersion in varistor characteristics. Specifically, the V1mA variation coefficient was calculated, based on a standard deviation ($\sigma$) of the variation in voltage (V1 mA) measured with respect to a multilayer varistor 1 with V1mA=27 V, by the equation: V1mA variation coefficient=$\sigma \times 100$/V1mA (%).

If the V1mA variation coefficient is equal to or greater than 0.4% and equal to or less than 3.7%, then the sample may be graded to be a "GO." On the other hand, if the V1mA variation coefficient is greater than 3.7%, then the sample may be graded to be a "NO-GO."

(Voltage Nonlinearity)

A voltage nonlinearity index ($\alpha$) was calculated as an index to the voltage nonlinearity. The voltage nonlinearity index ($\alpha$) was calculated, based on a varistor voltage (V1) measured when a current I1 (of 1 mA) was supplied and a varistor voltage (V2) measured when a current I2 (of 0.01 mA) was supplied, by the equation: $\alpha=\log (I1/I2)/\log (V1/V2)$.

The larger the $\alpha$ value is, the better the voltage nonlinearity is. If $\alpha$ is equal to or greater than 14, then the sample may be graded as a "GO." If $\alpha$ is less than 14, then the sample may be graded as a "NO-GO."

(Pr Concentration Increase Ratio)

The Pr concentration increase ratio was obtained in the following manner. Specifically, a cross section, which had been taken by cutting off the multilayer varistor such that the respective neighboring regions and the adjacent regions were exposed, was analyzed with an X-ray microanalyzer (XMA) such that X-ray intensities derived from Zn or Pr were measured in the respective regions, thereby obtaining the Pr concentrations (Pr/Zn) in the respective regions. Then, the Pr concentration increase ratio was calculated by the equation: Pr concentration increase ratio=Pr concentration in neighboring regions/Pr concentration in adjacent regions.

If the Pr concentration increase ratio is equal to or less than 2.0, then the sample may be graded as a "GO." On the other hand, if the Pr concentration increase ratio is greater than 2.0, then the sample may be graded as a "NO-GO."

(Sintered Condition)

The sample was graded as follows in teams of the sintered condition of the sintered compact by measuring the shrinkage ratio at the time of the baking process (=thickness of baked multi-layer stack$\times$100/thickness of multi-layer stack yet to be baked) (%):

Grade A (GO): if the shrinkage ratio was equal to or less than 90%, or

Grade B (NO-GO): if the shrinkage ratio was greater than 90%.

TABLE 1

| | | Step 2A (<500° C.) | Step 2B (500-800° C.) | Step 2C (800-1300° C.) | Pr concentration increase ratio | Internal electrode composition | Sintered condition | Characteristics | |
|---|---|---|---|---|---|---|---|---|---|
| | | | | | | | | V1mA variation coefficient (%) | Voltage Nonlinearity index ($\alpha$) |
| Ex. 1 | Temperature increase rate | 50° C./h | 500° C./h | 200° C./h | 1.2 | AgPd | A | 0.8 | 40 |
| | O$_2$ concentration | 500 ppm | 500 ppm | 2000 ppm | | (3.7) | | | |
| Ex. 2 | Temperature increase rate | 50° C./h | 50° C./h | 200° C./h | 1.1 | Pd | A | 0.6 | 45 |
| | O$_2$ concentration | 500 ppm | 5 ppm | 2000 ppm | | | | | |
| Cmp. Ex. 1 | Temperature increase rate | 50° C./h | 500° C./h | 200° C./h | 4.0 | Pd | A | 7.0 | 5 |
| | O$_2$ concentration | 500 ppm | 5000 ppm | 100 ppm | | | | | |
| Cmp. Ex. 2 | Temperature increase rate | 50° C./h | 500° C./h | 200° C./h | 4.0 | AgPd | B | 10.0 | 3 |
| | O$_2$ concentration | 10 ppm | 5000 ppm | 100 ppm | | (3.7) | | | |
| Ref. Ex. 1 | Temperature increase rate | 50° C./h | 500° C./h | 200° C./h | 1.7 | Pd + 01 mol % of Al added | A | 1.5 | 7 |
| | O$_2$ concentration | 500 ppm | 500 ppm | 2000 ppm | | | | | |

The results shown in Table 1 reveal that the multilayer varistors formed by the manufacturing methods according to the first and second examples each exhibited little dispersion in the varistor characteristics and excellent voltage nonlinearity. On the other hand, the multilayer varistors formed by the manufacturing methods according to the first and second comparative examples were each inferior in variation coefficient and/or voltage nonlinearity. The multilayer varistor according to the first reference example used Pd, to which Al had been added, as a material for the internal electrodes thereof, and therefore, its voltage nonlinearity decreased.

(Recapitulation)

As can be seen from the foregoing description of the exemplary embodiment and its specific examples, a method for manufacturing a multilayer varistor according to a first aspect of the present disclosure includes a first step and a second step. The first step includes providing a multilayer stack in which a plurality of green sheet layers and a plurality of internal electrode paste layers are alternately stacked one on top of another. Each of the plurality of green sheet layers contains a Zn oxide powder as a main component thereof and a Pr oxide powder as a sub-component thereof. Each of the plurality of internal electrode paste layers contains a Pd powder. The second step includes forming a sintered compact including an internal electrode inside by baking the multilayer stack. The second step includes a first sub-step (corresponding to step 2B) and a second sub-step (corresponding to step 2C) to be performed after the first sub-step has been performed. The first sub-step includes baking the multilayer stack by setting an oxygen concentration in an atmosphere at 1000 ppm by volume or less while increasing a temperature from 500° C. to 800° C. The second sub-step includes baking the multilayer stack by setting the oxygen concentration in the atmosphere at 1000 ppm by volume or more while increasing the temperature to a maximum allowable temperature.

The first aspect enables restricting the movement of a Pr oxide toward the internal electrode paste layers in the first sub-step and reducing the chances of causing a decline in the grain boundary insulation resistance during the sintering process in the second sub-step, thus providing a multilayer varistor which tends to exhibit a significantly reduced dispersion in its varistor characteristics and excellent voltage nonlinearity.

In a method according to a second aspect of the present disclosure, which may be implemented in conjunction with the first aspect, the second step further includes a third sub-step (corresponding to step 2A) of baking the multilayer stack by setting the oxygen concentration in the atmosphere at 100 ppm by volume or more while increasing the temperature before the first sub-step.

The second aspect allows the multilayer stack to be sintered more perfectly while reducing the chances of causing an increase in $Zn^+$ concentration in ZnO and thereby causing a decline in the grain boundary insulation resistance during the baking process, thus further improving the voltage nonlinearity.

In a method according to a third aspect of the present disclosure, which may be implemented in conjunction with the first or second aspect, the first sub-step includes setting an average temperature increase rate at a value equal to or greater than 100° C./h and equal to or less than 1000° C./h when the oxygen concentration in the atmosphere is equal to or higher than 100 ppm by volume and equal to or lower than 1000 ppm by volume.

The third aspect enables, even if the oxygen concentration is relatively high, further restricting the movement of the Pr oxide toward the internal electrode paste layers by increasing the temperature increase rate, thus enabling further reducing the dispersion in varistor characteristics.

In a method according to a fourth aspect of the present disclosure, which may be implemented in conjunction with the first or second aspect, the first sub-step includes setting an average temperature increase rate at a value equal to or greater than 25° C./h and equal to or less than 200° C./h when the oxygen concentration in the atmosphere is equal to or higher than 0.1 ppm by volume and equal to or lower than 100 ppm by volume.

The fourth aspect enables, if the oxygen concentration is relatively low, further restricting the movement of the Pr oxide toward the internal electrode paste layers by further decreasing the temperature increase rate, thus enabling further reducing the dispersion in varistor characteristics.

In a method according to a fifth aspect of the present disclosure, which may be implemented in conjunction with any one of the first to fourth aspects, the second sub-step includes setting an average temperature increase rate at a value equal to or greater than 100° C./h and equal to or less than 400° C./h.

The fifth aspect reduces the variation in, and thereby stabilizes, the oxygen concentration in the atmosphere, thus further reducing the chances of causing a decline in the grain boundary insulation resistance while the Zn oxide is being sintered and thereby further improving the voltage nonlinearity.

A multilayer varistor (1) according to a sixth aspect of the present disclosure includes a sintered compact (11), at least one pair of internal electrodes (12), and at least one pair of external electrodes (13). The sintered compact (11) contains a Zn oxide as a main component thereof and a Pr oxide as a sub-component thereof. The at least one pair of internal electrodes (12) is provided inside the sintered compact (11) and contains Pd as a main component thereof. The at least one pair of external electrodes (13) is arranged to cover the sintered compact (11) partially and electrically connected to the at least one pair of internal electrodes (12), respectively. In a part, located between the at least one pair of internal electrodes (12), of the sintered compact (11), a concentration of Pr relative to Zn in a neighboring region (11a) in the vicinity of each of the at least one pair of internal electrodes (12) is at most twice as high as a concentration of Pr relative to Zn in a region (11b) adjacent to the neighboring region (11a).

The sixth aspect enables decreasing the non-uniformity in the distribution of Pr, which would have something to do with the dispersion in the varistor characteristics, thus providing a multilayer varistor (1) with a reduced dispersion in varistor characteristics.

In a multilayer varistor (1) according to a seventh aspect of the present disclosure, which may be implemented in conjunction with the sixth aspect, at least one element selected from the group consisting of Al, In, and Ga is substantially not contained in the at least one pair of internal electrodes (12).

According to the seventh aspect, the at least one pair of internal electrodes (12) contains none of these elements, thus allowing the multilayer varistor (1) to exhibit excellent voltage nonlinearity.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A method for manufacturing a multilayer varistor, the method comprising:
a first step of providing a multilayer stack in which a plurality of green sheet layers and a plurality of internal electrode paste layers are alternately stacked one on top of another, each of the plurality of green sheet layers containing a Zn oxide powder as a main component thereof and a Pr oxide powder as a sub-component thereof, each of the plurality of internal electrode paste layers containing a Pd powder; and
a second step of forming a sintered compact, including an internal electrode inside, by baking the multilayer stack, the second step including
a sub-step of baking the multilayer stack by setting an oxygen concentration in an atmosphere at 100 ppm by volume or more while increasing a temperature before a first sub-step;
the first sub-step of baking the multilayer stack by setting the oxygen concentration in the atmosphere at 1000 ppm by volume or less while increasing the temperature from 500° C. to 800° C.; and
a second sub-step of baking, after having performed the first sub-step, the multilayer stack by setting the oxygen concentration in the atmosphere at 1000 ppm by volume or more while increasing the temperature to a maximum allowable temperature.

2. The method of claim 1, wherein the first sub-step includes setting an average temperature increase rate at a value equal to or greater than 100° C./h and equal to or less than 1000° C./h when the oxygen concentration in the atmosphere is equal to or higher than 100 ppm by volume and equal to or lower than 1000 ppm by volume.

3. The method of claim 1, wherein the first sub-step includes setting an average temperature increase rate at a value equal to or greater than 25° C./h and equal to or less than 200° C./h when the oxygen concentration in the atmosphere is equal to or higher than 0.1 ppm by volume and equal to or lower than 100 ppm by volume.

4. The method of claim 1, wherein the second sub-step includes setting an average temperature increase rate at a value equal to or greater than 100° C./h and equal to or less than 400° C./h.

5. A multilayer varistor comprising:
a sintered compact containing a Zn oxide as a main component thereof and a Pr oxide as a sub-component thereof;
at least one pair of internal electrodes provided inside the sintered compact and containing Pd as a main component thereof; and
at least one pair of external electrodes arranged to cover the sintered compact partially and electrically connected to the at least one pair of internal electrodes, respectively, wherein:
in a part, located between the at least one pair of internal electrodes, of the sintered compact, a concentration of Pr relative to Zn in a neighboring region of each of the at least one pair of internal electrodes is at most twice as high as a concentration of Pr relative to Zn in a region adjacent to the neighboring region, and
Al is not contained in the at least one pair of internal electrodes.

6. The multilayer varistor of claim 5, wherein
at least one element selected from the group consisting of In and Ga is not contained in the at least one pair of internal electrodes.

* * * * *